July 3, 1956  S. SIKORA  2,752,939
HYDRAULIC SAFETY VALVE
Filed Oct. 22, 1953  2 Sheets-Sheet 1
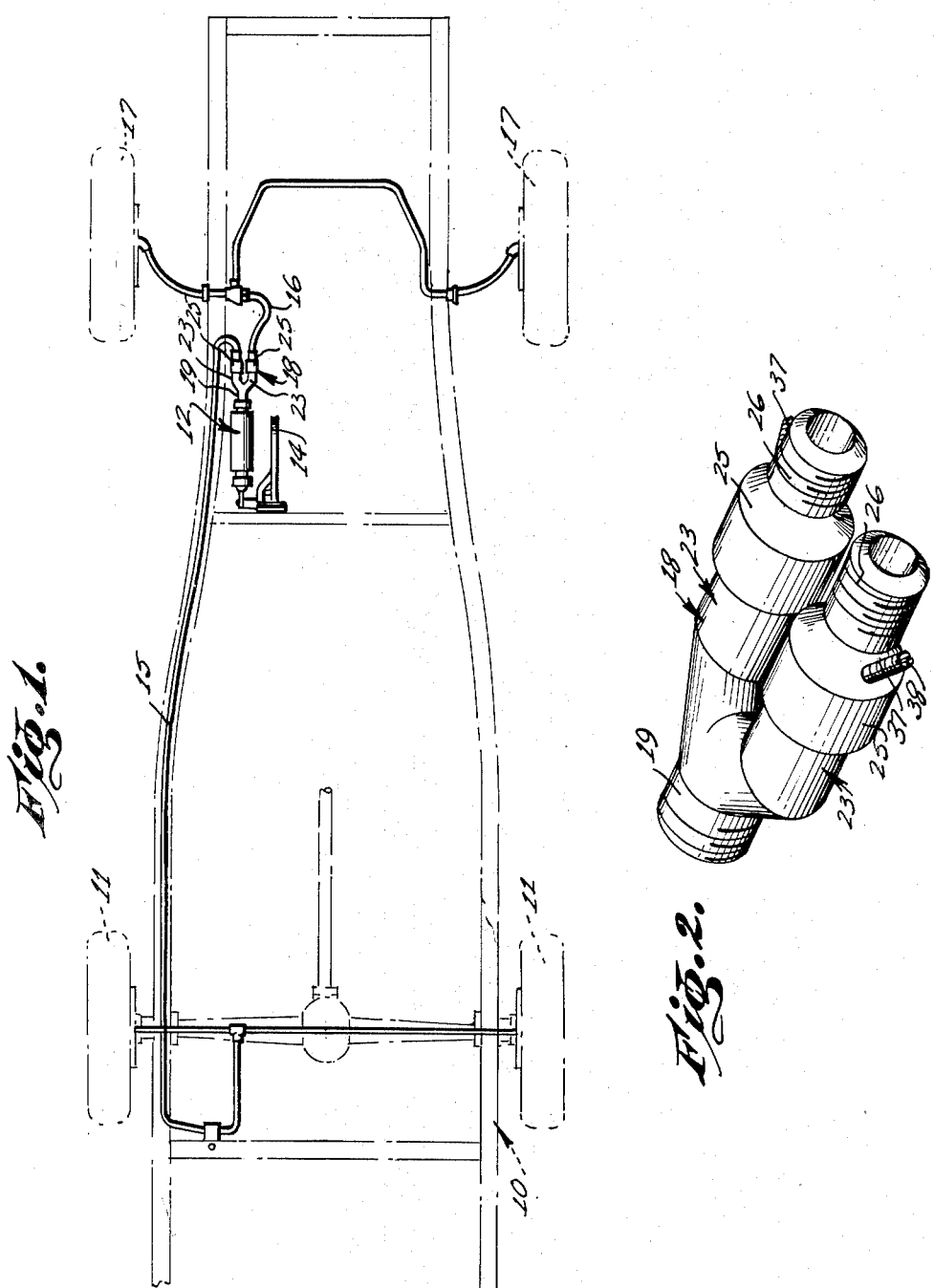
INVENTOR.
Stanley Sikora
BY Victor J. Evans & Co.
ATTORNEYS July 3, 1956  S. SIKORA  2,752,939
HYDRAULIC SAFETY VALVE
Filed Oct. 22, 1953  2 Sheets-Sheet 2
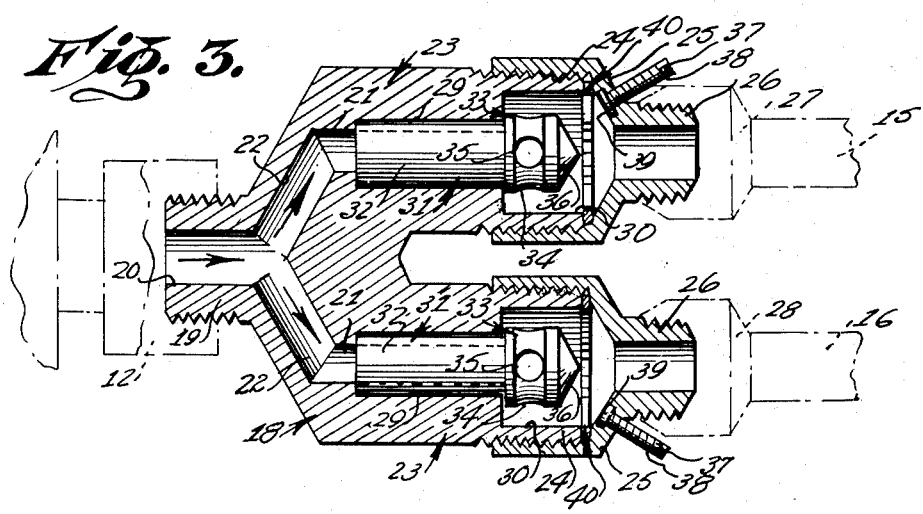
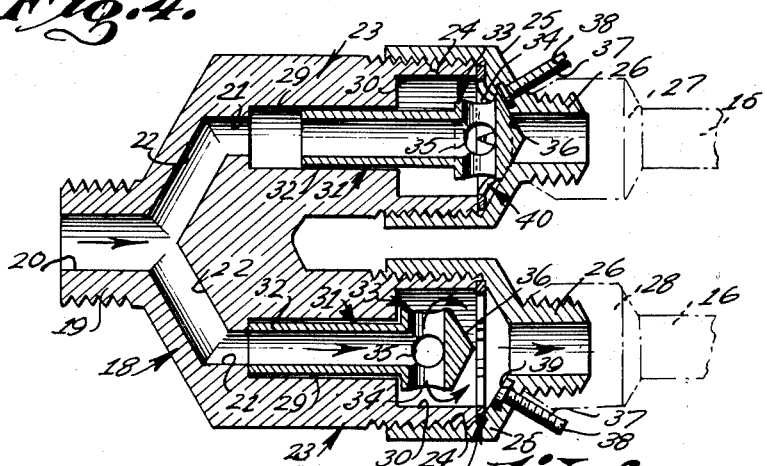
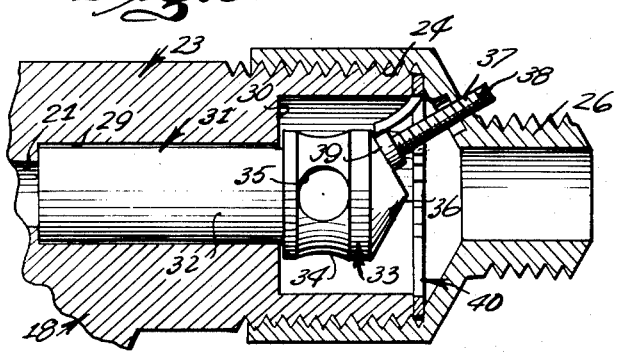
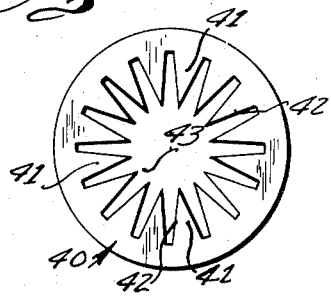
INVENTOR.
Stanley Sikora
BY Victor J. Evans & Co.
ATTORNEYS United States Patent Office 2,752,939
Patented July 3, 1956

2,752,939
HYDRAULIC SAFETY VALVE

Stanley Sikora, Lancaster, N. Y.

Application October 22, 1953, Serial No. 387,754

3 Claims. (Cl. 137—460)

This invention relates to a vehicle hydraulic brake system, and more particularly to a safety valve for a hydraulic brake system.

The object of the invention is to provide a safety valve which will prevent the loss of all the brake fluid should any one line develop a leak.

Another object of the invention is to provide a hydraulic safety valve which is adapted to be detachably connected to the master brake cylinder, the safety valve of the present invention adapted to be used in all hydraulic fluid systems that use a double pipe line whereby the fluid and pressure will be retained in one pipe line in the event a break occurs in one of the two pipe lines of the hydraulic fluid system.

A further object of the invention is to provide a hydraulic safety valve which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a plan view of the master control for a brake system and showing the safety valve of the present invention installed therein.

Figure 2 is a perspective view of the hydraulic safety valve.

Figure 3 is a longitudinal sectional view taken through the safety valve.

Figure 4 is a view similar to Figure 3 but showing a plunger closing one of the lines as when a leak occurs in that line.

Figure 5 is an enlarged elevational view, with parts broken away and in section showing the method of forcing a plunger back by means of the screw or securing element.

Figure 6 is an elevational view of the retaining disk.

Referring in detail to the drawings, the numeral 10 designates in broken lines a portion of a vehicle frame or chassis which includes rear wheels 11 and front wheels 17. The master cylinder for the brake system is indicated by the numeral 12, and the brake pedal is indicated by the numeral 14. A line 15 is adapted to convey hydraulic brake fluid from the master cylinder to the brakes for the rear wheels 11, and a line 16 serves to convey hydraulic brake fluid from the master cylinder to the brakes for the front wheels 17, Figure 1.

There is provided a hydraulic safety valve which is indicated generally by the numeral 18, and the safety valve 18 includes a neck 19 which is threaded exteriorly for engagement with the master cylinder 12, Figure 3. The neck 19 is provided with a nassageway 20 whereby brake fluid can flow from the master cylinder through the neck 19, and communicating with the passageway 20 is a pair of passageways 22 which are arranged in divergent relation with respect to each other, Figures 3 and 4. The valve of the present invention further includes a pair of spaced apart necks or sleeves 23 which each have the same construction. Thus, each of the neck 23 is provided with a passageway 21 that communicates with the passageways 22.

Each of the necks 23 is provided with a threaded end portion 24, and a collar or bushing 25 is arranged in threaded engagement with each of the threaded portions 24. Each of the bushings 25 includes an exteriorly threaded reduced diameter portion 26, and a fitting 27 is arranged in engagement with one of the threaded portions 26 for connecting the line 15 to one of the necks 23. A similar fitting 28 is arranged in threaded engagement with the other portion 26 for connecting the other line 16 to the other neck 23.

The valve of the present invention further includes a pair of shiftable plungers 31, Figure 5, and one of the plungers 31 is reciprocably arranged in each of the necks 23. Each of the plungers 31 includes a hollow stem 32 that is slidably mounted in a bore 29 in the neck 23, and secured to the stem 32 or formed integral therewith is a head 33 which is movably mounted in a chamber or recess 30 in the neck 23, Figures 3 and 4. Each of the heads 33 is provided with an annular groove 34 for a purpose to be later described, and there is further provided in each of the heads of plurality of openings 35 which communicate with the interior of the hollow stems 32. The end of each of the heads 33 is tapered or pointed as at 36.

Arranged in threaded engagement with each of the bushings 25 is a securing element or threaded screw member 37 which is provided with a kerf or slit 38 in its outer end whereby a suitable tool such as a screwdriver can be arranged in engagement with the slit 38 for rotating the element 37. A button or knob 39 is mounted on the inner end of each of the members 37 for engagement with the pointed ends or inclined surfaces 36 of the heads 33.

There is further positioned within each of the bushings 25 a disk 40, Figure 6. The disk 40 may be made of any suitable material having the desired rigidity and flexibility, and the disk 40 is provided with a central opening 43. A plurality of triangular shaped ribs or prongs 41 extend inwardly from the disk 40, and V-shaped cutouts or recesses 42 are positioned between each triangular shaped rib 41. A suitable seat may be provided in the bushings 25 for the reception of the disk 40.

From the foregoing it is apparent that a safety valve has been provided for hydraulic brake systems of vehicles whereby in the event of a breakage or leak in the fluid line leading to either the front or rear wheels the leaking line will be automatically shut-off but the fluid will be permitted to flow through the unaffected line so that fluid will be supplied to the wheel brakes associated with the unaffected line. The present invention is extremely simple and inexpensive to manufacture. The valve 18 is screwed into the master brake cylinder 12 and the valve 18 includes the two outlets 23. Hydraulic pipe lines 16 and 15 are connected to the outlets 23 through the medium of the bushings 25 and these lines 15 and 16 lead to the front wheel brakes and rear wheel brakes. When filling the hydraulic brake system with hydraulic brake fluid, the brake fluid is poured into the master brake cylinder 12 and this brake fluid flows from the master cylinder 12 and passes through the safety valve 18 to reach the brakes that are attached to each of the four wheels 11 and 17 of the vehicle. When passing through the safety valve 18, this brake fluid passes through the plungers 31 and comes out the openings 35 and then goes through the bushings 25 and enters the pipe lines 15 and 16 that lead to the front and rear wheel brakes of a vehicle such as an automobile when a person presses down on the foot brake pedal. When the brake pedal is depressed, the pressure created in the master cylinder 12 reaches the four wheel brakes.

In Figure 3 the parts are shown in the position during normal use of the brake system as when there are no leaks in the system. Assume as an example that a leak occurs in the brakes for the rear wheels 11 or assume that a leak occurs in the line 15 leading to the rear wheel brakes. Then, the brake fluid leaking out the rear end must pass through that part of the valve that leads to the rear end conduit 15 and as this fluid passes through the plunger in the neck 23 that leads to the line 15, the force of the stream of brake fluid against the head 33 will force the plunger from the position shown in Figure 3 to the position shown in Figure 4 (upper portion of Figure 4) to thereby close the bushing 25 thus sealing off the leak in the rear brake system but at the same time retaining pressure in the front brake system. Thus, the automobile or other vehicle can be stopped with the two front wheel brakes. The two plungers 31 in the valve operate in the same manner so that if a leak occurred in the front brake system, the rear brake system would retain its brake pressure and enable a person to stop the vehicle with the rear wheel brakes.

When a plunger 31 is forced against a bushing 25 as when a leak occurs, the head 33 of the plunger passes through the center opening 43 in the corresponding disk 40 to force apart the fins 41 of the disk and cause the fins 41 to grip or engage the annular groove 34 in the head and thus hold the plunger 31 in its closing position as shown in Figure 4. To release the plunger 31 from the grip of the fins 41, it is only necessary to screw the proper securing element 37 inwardly until it contacts the pointed head 36 of the plunger and by continued inward movement of the member 37 the plunger will be forced back from the position shown in the top of Figure 4 to the position shown in Figure 3 or to the position shown in Figure 5 and the plunger can be held in its proper position until the leak in the hydraulic brake system is repaired. After the pipe lines are bled the air can be forced out of the lines in the usual manner. After this is accomplished the screw 37 can be returned from the position shown in Figure 5 to the position shown in Figures 3 and 4 whereby the hydraulic safety valve is ready to operate again in the event another break in the hydraulic brake system occurs. The valve of the present invention can be used in all types of hydraulic fluid systems which utilize a double pipe line to retain the fluid and pressure in one pipe line in the event a break occurs in one of the two pipe lines of the hydraulic fluid system.

What I claim is:

1. A safety valve for a hydraulic brake system comprising a body member provided with an exteriorly threaded hollow sleeve, a pair of spaced apart necks extending from said sleeve and each having a threaded end portion, a bushing arranged in engagement with the threaded portion of said necks, each of said necks being provided with a bore terminating in an enlarged chamber, a plunger reciprocably arranged in each of said necks and each having a hollow stem slidably mounted in said bore and a head secured to said stem and positioned in said chamber, each of said heads being provided with an outer annular groove, there being a plurality of openings in said head communicating with said hollow stem, and a disk positioned in each of said bushings and provided with a central opening for selectively receiving the head of said plunger, a plurality of triangular shaped flexible ribs extending inwardly from said disk adapted to engagement with the groove in said head when the head enters said opening, said ribs having V-shaped cutouts therebetween said bushings being provided with seats for receiving said heads when the heads pass through said disks whereby the heads can stop flow when the heads are moved into the disks.

2. The apparatus as described in claim 1, wherein an end of each of said heads is pointed, and a securing element arranged in threaded engagement with each of said bushings and having a button on its inner end engaging with the pointed ends of said heads when the heads extend through the opening in said discs.

3. A safety valve for a hydraulic brake system comprising a body member provided with an exteriorly threaded hollow sleeve, a pair of spaced apart necks extending from said sleeve and each having a threaded end portion, a bushing arranged in engagement with the threaded portion of said necks, each of said necks being provided with a bore terminating in an enlarged chamber, a plunger reciprocably arranged in each of said necks and each having a hollow stem slidably mounted in said bore and a head secured to said stem and positioned in said chamber, each of said heads having a pointed end and each of said heads being provided with an outer annular groove, there being a plurality of openings in said head communicating with said hollow stem, and a disk positioned in each of said bushings and provided with a central opening for selectively receiving the head of said plunger, a plurality of triangular shaped flexible ribs extending inwardly from said disk adapted to engage with the groove in said head when the head enters said opening, said ribs having V-shaped cutouts therebetween, and a securing element arranged in threaded engagement with each of said bushings and having a button on its inner end engaging with the pointed ends of said heads when the heads extend through the openings in said discs, the outer end of each of said securing elements being provided with a slit said bushings being provided with seats for receiving the pointed ends of said heads when the heads pass through said disks whereby the heads can stop flow when the heads are moved into the disks.

References Cited in the file of this patent

UNITED STATES PATENTS

| | | |
|---|---|---|
| 1,993,873 | Claspy | Mar. 12, 1935 |
| 2,127,399 | George | Aug. 16, 1938 |
| 2,322,658 | Overbeke | June 22, 1943 |
| 2,657,706 | Stevenson | Nov. 3, 1953 |

FOREIGN PATENTS

| | | |
|---|---|---|
| 601,092 | Germany | Aug. 8, 1934 |